United States Patent [19]
Welch

[11] 4,068,892
[45] Jan. 17, 1978

[54] TAIL GATE APPARATUS HAVING AN OFFSET PIVOT AXIS

[76] Inventor: Rafael J. Welch, P.O. Box 175, St. John, Kans. 67576

[21] Appl. No.: 752,472

[22] Filed: Dec. 20, 1976

[51] Int. Cl.² ............................................. B60P 1/04
[52] U.S. Cl. .............................. 298/17 R; 298/23 D; 296/56
[58] Field of Search ............... 296/56, 57; 298/23 R, 298/23 MD, 23 M, 23 S, 23 A, 23 B, 23 F, 23 D, 23 DR, 23 TT, 17 R

[56] References Cited
U.S. PATENT DOCUMENTS
3,993,353  11/1976  Reilly ............................ 298/23 F X

FOREIGN PATENT DOCUMENTS
118,728  2/1970  Norway ................................. 296/56
1,243,664  8/1971  United Kingdom ................... 296/56

*Primary Examiner*—Frank E. Werner
*Attorney, Agent, or Firm*—Edwin H. Crabtree; John H. Widdowson

[57] ABSTRACT

A tail gate apparatus having an offset pivot axis for automatically opening and closing a tail gate mounted at the rear of a tiltable truck bed on a dump truck. The pivot axis positioned horizontally and parallel the width of the truck bed and at a predetermined distance forward the rear of the truck bed.

5 Claims, 9 Drawing Figures

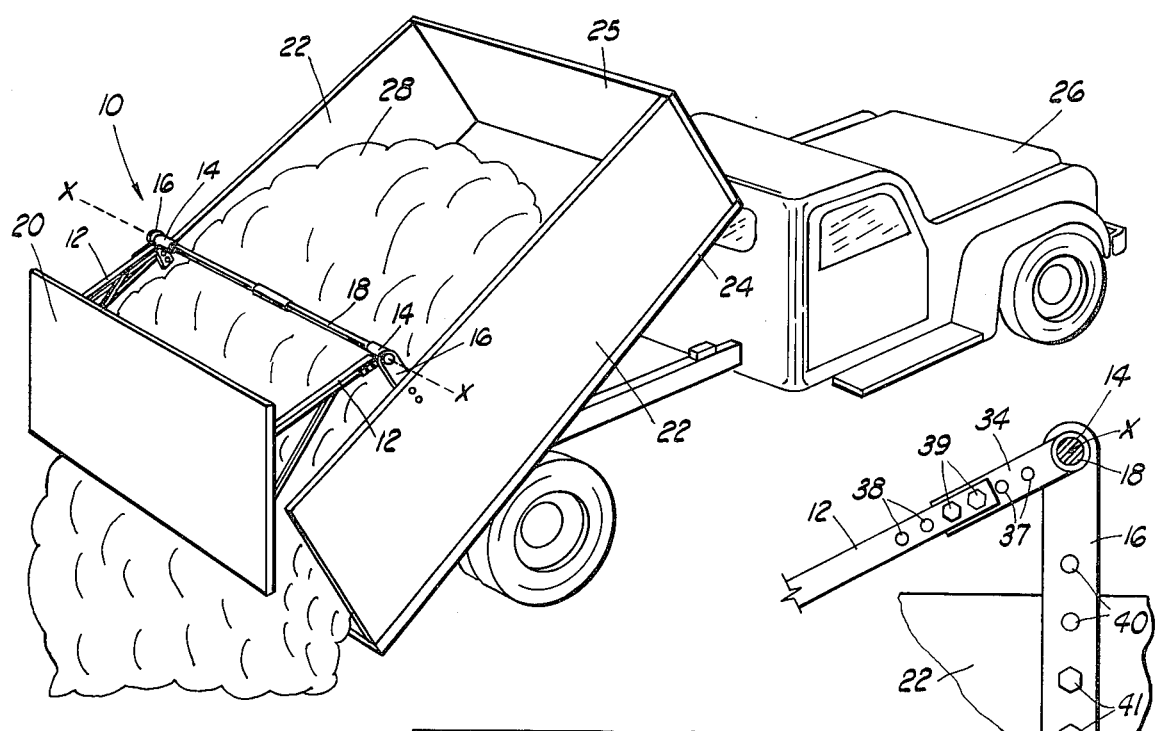
FIG. 1
FIG. 1A
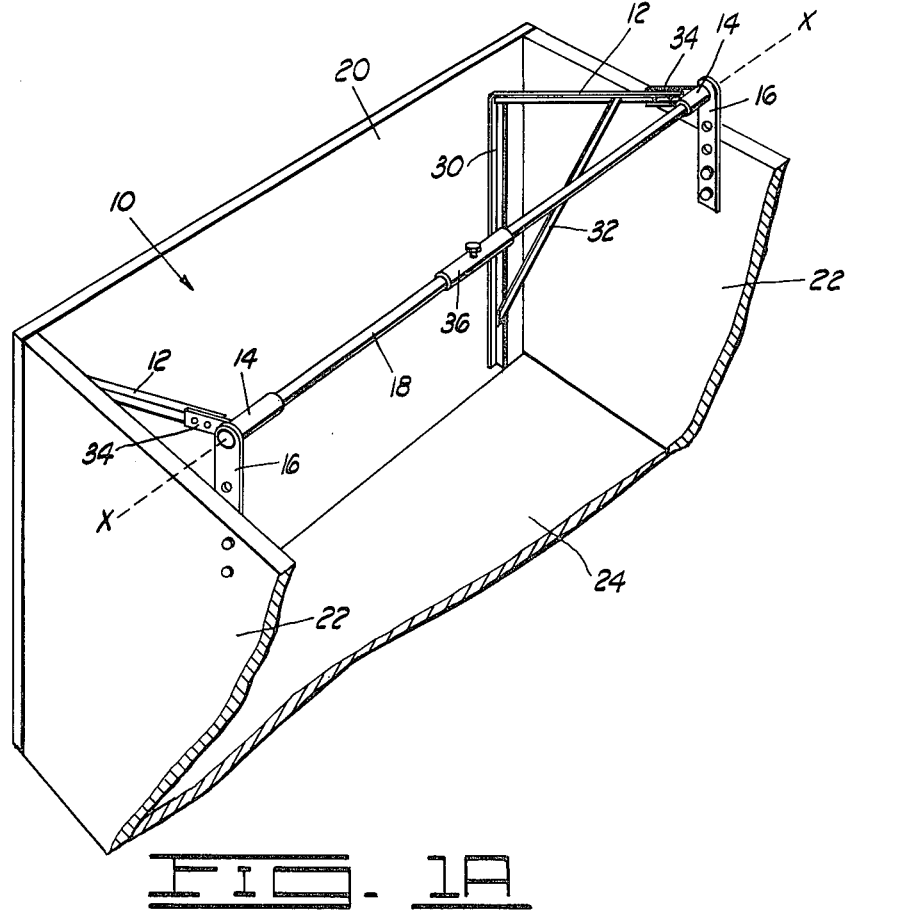

TAIL GATE APPARATUS HAVING AN OFFSET PIVOT AXIS

BACKGROUND OF THE INVENTION

This invention relates to the construction of a tiltable truck bed and more particularly but not by way of limitation to a tail gate apparatus for opening and closing a tail gate on a dump truck.

Heretofore, a tail gate on a dump truck has been mounted adjacent the vertical side walls and horizontal bottom of a truck bed. The tail gate is generally attached to the ends of the side walls and at the top thereof. The bottom portion of the tail gate is allowed to pivot outwardly from the side walls and the bottom of the truck bed. The tail gate is prevented from pivoting by various types of locking devices which secure the lower portion of the tail gate to the side walls and the bottom of the truck bed. When it is desired to unload the material from the truck bed, the operator unlocks the tail gate and the bed is raised. As the bed is raised, the material urges the tail gate open and the material slides outwardly through the gatelike opening between the tail gate and the rear of the truck bed. When the material is unloaded, the bed is lowered and the tail gate is locked in position against the side walls and the bottom of the truck bed.

There are prior art tail gates having various types of hinges and locking devices. Also there are tail gates which are raised and lowered using hydraulic rams. None of the prior art tail gates disclose a tail gate apparatus which automatically raises and lowers without the use of a power source or does not require a locking device to prevent the tail gate from opening while the material is being transported.

SUMMARY OF THE INVENTION

The subject invention is used on the truck bed of a dump truck for transporting heavy bulk loads such as ensilage, or lighter loads such as hay. The tail gate apparatus does not require a mechanical, electrical, or hydraulic lifting mechanism for raising the tail gate. The apparatus is automatically shoved open by the force of the material as the truck bed is raised into an unloading position. The tail gate is lowered into a position adjacent the truck bed by gravity when the material is unloaded.

The tail gate apparatus eliminates the need of a locking device to hold the tail gate in position on the truck bed while the material is being transported thereby reducing the time required in locking and unlocking the tail gate when the material is loaded and unloaded.

The invention is adjustable for mounting on various widths and lengths of truck beds. The apparatus is also adjustable so that the pivot axis of the tail gate can be positioned at a predetermined distance from the rear of the truck bed so that the tail gate can be raised and lowered automatically according to the type of material hauled in the truck bed.

The invention is simple in design yet rugged in construction and because no mechanical, electrical, or hydraulic lifting mechanisms are required, the maintenance in maintaining the apparatus is kept at a minimum.

The invention includes a pair of adjustable elongated gate arms attached at one end to the sides of the tail gate. The arms extend forwardly from the rear of the truck bed. A pair of collars are attached to the other end of the gate arms. A pair of mounting brackets are mounted on top of the side walls of the truck bed and at a predetermined distance on each side wall from the rear of the truck bed. An elongated pivot arm is mounted horizontally and parallel to the width of the truck bed. The pivot arm is slidably received through the collars and attached to the mounting brackets. The tail gate, gate arms, and collars pivot about a horizontal axis through the center of the pivot arm. The axis is offset from the top of the tail gate and forward the rear of the truck bed so that the tail gate will open and close automatically based on the angle of the unloading position of the truck bed from the horizontal and the pressure applied against the tail gate by the material being unloaded from the truck bed.

The advantages and objects of the invention will become evident from the following detailed description when read in conjunction with the accompanying drawings which illustrate the preferred embodiments of the invention.

BRIEF DESCRIPTION OF THE DRAWINGS

FIG. 1 is a perspective view of the tail gate apparatus attached to the rear of a truck bed in an unloading position on a dump truck.

FIG. 1A is a sectional view of the rear of the truck bed.

FIG. 1B is a side view of a mounting plate and a collar of the tail gate apparatus.

DETAILED DESCRIPTION OF THE DRAWINGS

Figure 2:
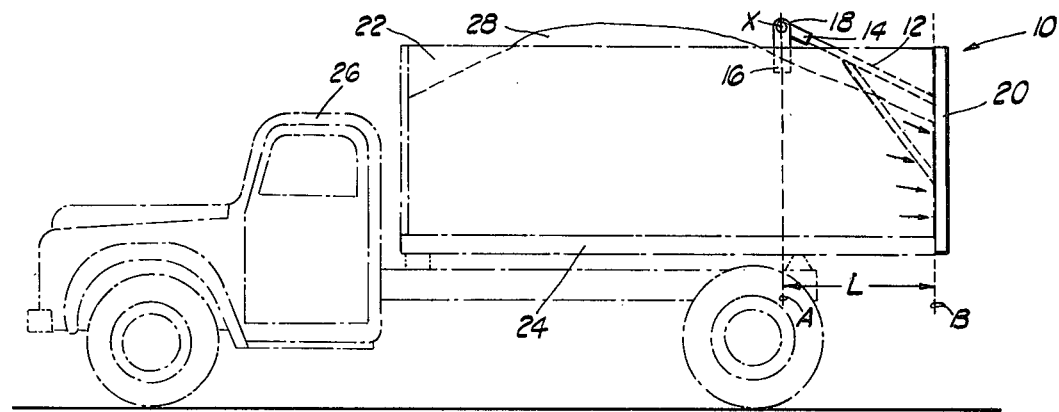
FIG. 2 is a side view of the dump truck with the tail gate apparatus mounted thereon. The truck being in a transport position.

In FIG. 1, the tail gate apparatus is designated by general reference numeral 10. The apparatus 10 includes a pair of gate arms 12, a pair of hollow collars 14, a pair of mounting brackets 16, and a pivot arm 18.

One end of the gate arms 12 is attached to the sides of a tail gate 20. The tail gate 20 pivots on the gate arms 12 which are attached to the sides of the hollow collars 14. The ends of the pivot arm 18 are slidably received through the hollow collars 14 and are attached to the mounting brackets 16. The collars 14 pivot on the pivot arm 18 about an axis X which extends along the length of the pivot arm 18 and through the center thereof. The mounting brackets 16 are attached to the top of vertical side walls 22 which are secured to a tiltable truck bed 24. A vertical front wall 28 is attached to the ends of the side walls 22 and the front of the bed 24. The bed 24 is raised out lowered on a dump truck 26 having a power lift means such as a hydraulic ram or the like.

In FIG. 1, the truck bed 24 is shown in a raised or unloading position for discharging a material 28 therein. The material 28 in this example may be considered chopped hay or the like. The hay 28 being a lighter material than a material such as ensilage which will be discussed under FIGS. 5 through 7. While materials such as hay, and ensilage will be discussed, it should be understood that various types of materials other than agricultural products such as dirt, rock, or any other type of bulk material may be hauled in a dump truck using the apparatus 10.

In FIG. 1A, a perspective view of the apparatus 10 is seen mounted in the rear of the truck bed 24. In this view, the tail gate 20 is vertically disposed against the ends of the side walls 22 and the bottom of the truck bed 24. In this position, the truck bed 24 is in it's normal horizontal transport position on the truck 26. The gate arms 12 are seen with bracing 30 and 32 for rigidly securing the gate arms 12 to the inside of the tail gate 20. In this view, the collars 14 are shown having outwardly extending collar arms 34 which are bolted to the ends of the gate arms 12.

Also seen in this view, is the hollow pivot arm sleeve 36 which is used to divide the pivot arm 18. The ends of the divided pivot arm 18 are received in the sleeve 36 and secured therein. The sleeve 36 provides means for adjusting the length of the pivot arm 18 for adapting the apparatus 10 to truck beds having various widths. The pivot arm 18 is mounted horizontally on the mounting brackets 16 and positioned parallel to the width of the truck bed 24.

In FIG. 1B, a detailed view of the mounting bracket 18 and collar 14 is illustrated. In this view, a cross section of the pivot arm 18 with pivot axis X through the center thereof can be seen received through the hollow collar 14. Extending outwardly from the collar 14 is the collar arm 34 having a plurality of apertures 37 therein. The end of the gate arm 12 includes a plurality of apertures 38. The apertures 38 of the gate arm 12 are indexed with the apertures 37 of the collar arm 34 and secured by bolts 39 so that the length of the elongated gate arm 12 can be adjusted. Similarly the mounting bracket 16 includes a plurality of apertures 40 therein. By indexing the apertures 40 with apertures in the sides of the side wall 22 and securing the bracket 16 thereto by bolts 41, the vertical height of the mounting plate 16 can be adjusted thereby adjusting the height of the pivot axis X.

In FIG. 2, a side view of the truck 26 with tiltable bed 24 is illustrated wherein the tiltable bed 24 is in a normal horizontal transport position and carrying the chopped hay material 28. In this view, the axis X of the pivot arm 18 can be seen as a point and offset from the top of the tail gate 20 and forward therefrom. The pivot arm 18 with axis X is mounted a distance L between a vertical line B drawn through the rear of the truck bed 24 and a vertical line A drawn through the center of the pivot arm 18. The tail gate 20 is pivoted about the axis X of the pivot arm 18 via the gate arm 12 and collar 14. The weight of the tail gate 20 in combination with the distance L produce a moment force urging the tail gate 20 downwardly in a clockwise direction toward a position directly below the pivot axis X. This moment force holds the tail gate 20 against the ends of the side walls 22 and the bottom of the truck bed 24. The moment force is a product of the distance L and the weight of the tail gate 20. The predetermined distance L will vary depending on the type of material hauled in the truck bed 24 and the force the material applies against the sides of the tail gate 20. Since the weight of the tail gate 20 is constant, the distance L must be great enough to prevent the material from raising the tail gate 20 in a counter clockwise direction while the material is being transported in the truck 26.

Figure 3:
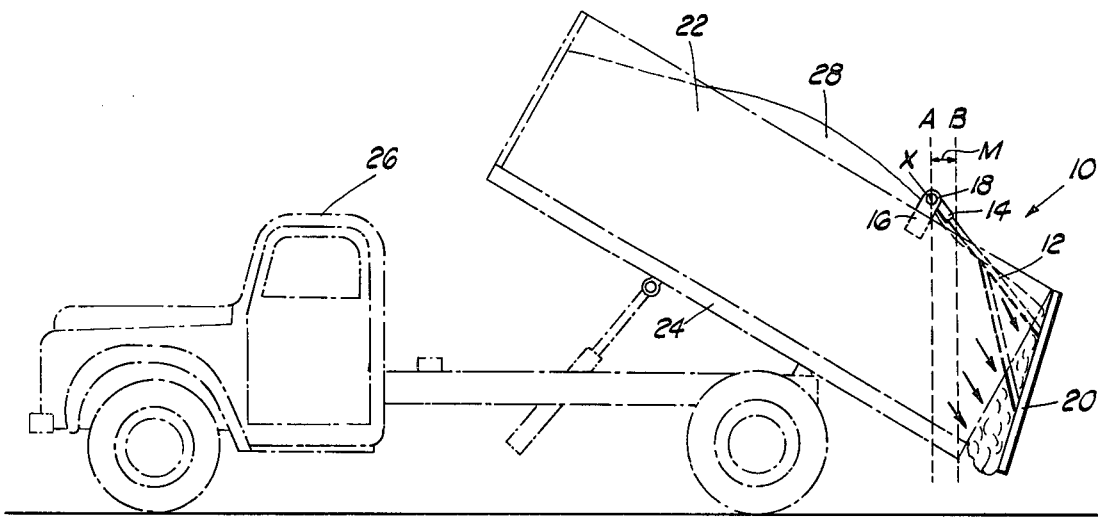
FIG. 3 is a side view of the dump truck with the truck bed raised and the tail gate apparatus partially opened for unloading the material therein.

In FIG. 3, the truck bed 24 has been raised from a horizontal position and the material 28 has begun to slide downwardly urging the tail gate 20 outwardly in a counter clockwise direction. As the truck bed 24 is raised, the pivot axis X moves toward the vertical line B. The distance between line A and line B is illustrated as distance M which is substantially less than the distance L in FIG. 2. The moment force of the weight of the tail gate 20 and the distance M is substantially less than the moment force of the distance L and the weight of the tail gate 20. Therefore, the weight of the material 28 has begun to overcome the moment force thereby rotating the tail gate 20 outwardly in a counter clockwise direction so that the material 28 has automatically begun to unload from the rear of the truck bed 24.

Figure 4:
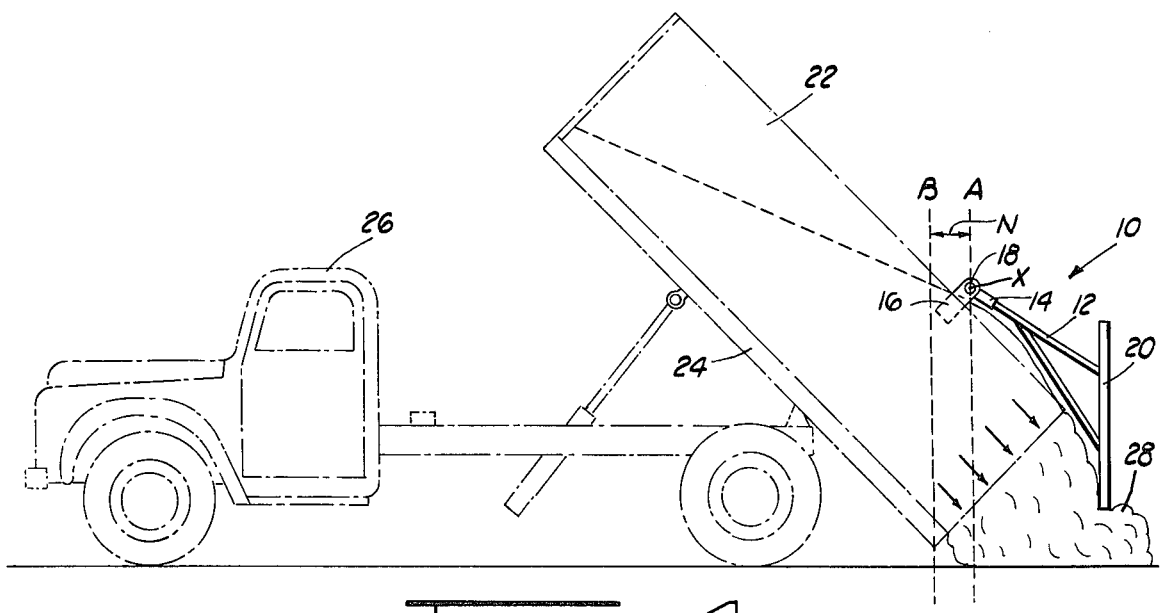
FIG. 4 is a side view of the dump truck with the truck bed in a completely raised position for unloading the material therein.

In FIG. 4, the truck bed 24 is in a completely raised position and the pivot axis X has now moved on the opposite side of the vertical line B a distance N. In this position, the tail gate 20 would ordinarily be floating vertically and directly below the pivot axis X. But in this view, the tail gate 20 is extended outwardly due to the material 28 flowing through the gate-like opening at the rear of the truck bed 24.

Figure 5:
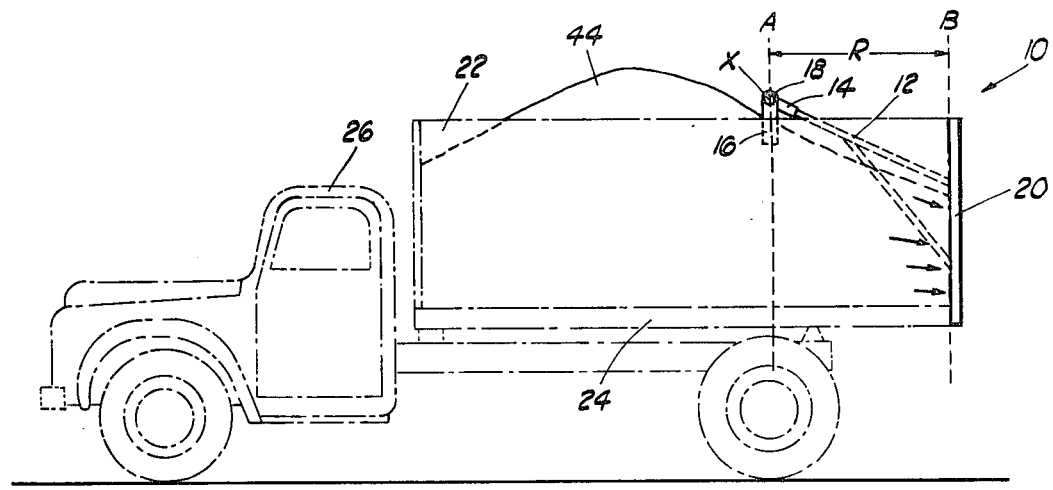
FIG. 5 is similar to FIG. 2, but illustrates the tail gate apparatus mounted at a different predetermined distance from the rear of the truck bed for hauling a different material therein.

In FIG. 5, a similar side view of the truck 26 shown in FIG. 2, is illustrated except in this view the truck 26 is transporting a heavier material 44 such as ensilage. Because ensilage is heavier than the chopped hay 28, the weight of the ensilage against the inside of the tail gate 20 is greater. Therefore, the forces tending to urge the tail gate 20 in a counter clockwise direction, are greater, and the offset axis X must be readjusted so that the pivot arm 18 is positioned a predetermined distance R between vertical lines A and B which is greater than the distance L shown in FIG. 2. By adjusting the length of the gate arms 12 as discussed under FIG. 1B and moving the mounting brackets 16 forward on the sides of the side walls 22, the distance L in FIG. 2 is increased to a distance R. The product of the distance R and the weight 20 of the tail gate produces a moment force great enough to overcome the forces produced by the weight of the material 44 against the inside of the tail gate 20 thereby preventing the tail gate 20 from opening while the material is being transported.

Figure 6:
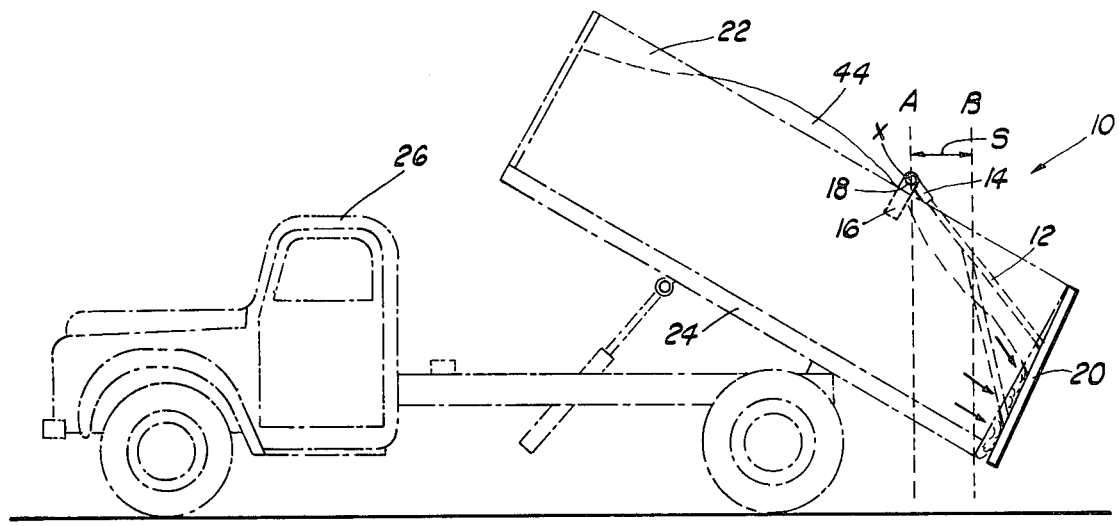
FIG. 6 is a similar to FIG. 3 with the truck bed in a raised position for unloading the material therein.

In FIG. 6, the truck bed 24 is raised and the pivot axis X moves toward the vertical line B. In this view, the distance between lines A and B is S. The product of the distance S and the weight of the tail gate 20 is now less than the moment force of the product of the distance R and the weight of the tail gate 20 illustrated in FIG. 5. In FIG. 6, the force of the material 44 now in a tilted position has now begun to overcome the moment force and the tail gate 20 is urged outwardly in a counter clockwise direction automatically opening the tail gate 20.

Figure 7:
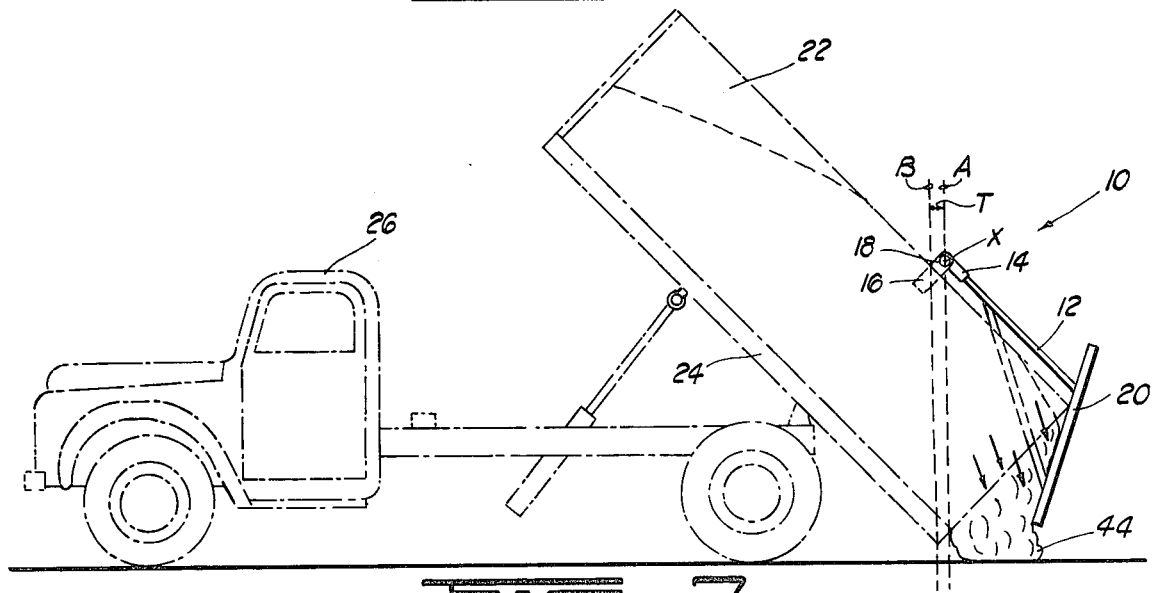
FIG. 7 is similar to FIG. 4 with the truck bed in a completely raised position and unloading the material therein.

In FIG. 7, the truck bed 24 is in a completely raised position and the pivot axis X has now moved past the vertical line B a distance T and the tail gate 20 is floating freely except for the material 44 which is being discharged between the rear of the truck bed 24 and the inside of the tail gate 20.

As discussed in FIGS. 2 through 7, the use of an offset axis X through a horizontal pivot arm 18 for pivoting a tail gate 20 thereon provides a tail gate assembly 10 which automatically raises and lowers in hauling various types of materials in a truck bed. The predetermined distance being the horizontal distance between a vertical line through the rear of the truck bed and a vertical line through the horizontal pivot axis X of the pivot arm 18. The predetermined distance being greater for heavier materials for producing a greater moment force to offset the forces of the material tending to open the tail gate 20 while it is being transported. When lighter materials such as chopped hay are transported, the predetermined distance is less since the force of the hay against the tail gate 20 is less.

Changes may be made in the construction and arrangements of the parts or elements of the embodiments as disclosed herein without departing from the spirit or scope of the invention as defined in the following claims.

I claim:

1. A tail gate apparatus having an offset pivot axis for automatically opening and closing a tail gate mounted at the rear of a tiltable truck bed mounted on a dump truck, the truck bed having a vertical front wall and vertical side walls, the tail gate disposed adjacent the ends of the side walls and the bottom of the truck bed when the bed is in a horizontal position, the apparatus comprising:

a pair of elongated gate arms attached at one end to the sides of the tail gate, said gate arms extending forwardly toward the front wall;

a pair of collars having collar arms extending outwardly therefrom, said collar arms adjustably attached to the other end of said gate arms for adjusting the length of the gate arms;

a pair of vertically adjustable mounting brackets mounted on top of the side walls, said mounting brackets positioned at a predetermined distance on each side wall from the rear of the truck bed; and an elongated pivot arm mounted horizontally and parallel to the width of the truck bed, said pivot arm slidably received through said collars, the ends of said pivot arm attached to the top of said mounting brackets;

the tail gate, said gate arms and said collars pivoting about a horizontal axis through the center of said pivot arm, the axis offset and forward the rear of the truck bed so that the tail gate will open and close automatically based on the angle of the unloading position of the truck bed from the horizontal and the pressure applied against the tail gate by the material being unloaded from the truck bed.

2. The apparatus as described in claim 1, further including bracing attached to the inside of the tail gate and to said elongated gate arms for securing said gate arms to the tail gate.

3. A tail gate apparatus having an offset pivot axis for automatically opening and closing a tail gate mounted at the rear of a tiltable truck bed mounted on a dump truck, the truck bed having a vertical front wall and vertical side walls, the tail gate disposed adjacent the ends of the side walls and the bottom of the truck bed when the bed is in a horizontal position, the apparatus comprising:

a pair of elongated gate arms attached at one end to the sides of the tail gate, said gate arms extending forwardly toward the front wall;

a pair of collars including collar arms extending outwardly from said collars, said collar arms having a plurality of apertures therein for adjustably attaching to the other end of said elongated gate arms;

a pair of mounting brackets mounted on top of the side walls, said mounting brackets positioned at a predetermined distance from the rear of the truck bed; and an elongated pivot arm mounted horizontally and parallel to the width of the truck bed, said pivot arm slidably received through said collars, the ends of said pivot arm attached to said mounting brackets;

the tail gate, said gate arms and said collars pivoting about a horizontal axis through the center of said pivot arm, the horizontal axis offset and forward the rear of the truck bed so that the tail gate will open and close automatically based on the angle of the unloading position of the truck bed from the horizontal and the pressure applied against the tail gate by material being unloaded from the truck bed, by indexing the apertures in the end of said gate arms with selected apertures in said collar arms and bolting the arms together, the distance between the tail gate and the axis of rotation of said pivot arm may be adjusted.

4. The apparatus as described in claim 3, further including a pivot arm sleeve dividing said pivot arm, the ends of the divided pivot arm slidably received in said sleeve and secured thereto, said sleeve providing means for adjusting the width of said pivot arm to correspond with truck bodies having various widths.

5. The apparatus as described in claim 3, wherein said mounting brackets are mounted vertically on the top of the side walls of the truck body, said mounting brackets having a plurality of apertures therein, by indexing the apertures in said mounting brackets with apertures in the top of the side walls and bolting said brackets to the side walls, the vertical height of the axis of rotation of said pivot arm can be adjusted.

* * * * *